No. 794,986. PATENTED JULY 18, 1905.
J. S. KENDIG & S. A. McCUNE.
FASTENER FOR TEETH FOR WEEDERS.
APPLICATION FILED APR. 22, 1905.
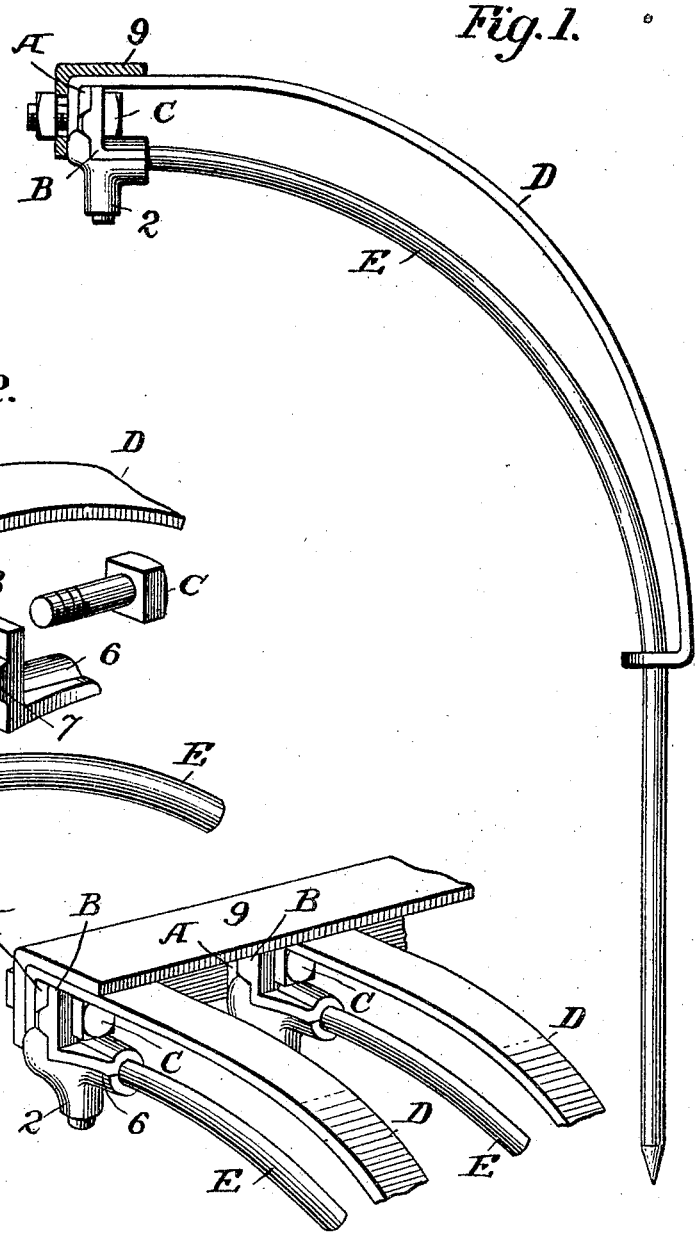

No. 794,986. Patented July 18, 1905.

UNITED STATES PATENT OFFICE.

JACOB S. KENDIG, OF YORK, PENNSYLVANIA, AND SAMUEL A. McCUNE, OF NEW WATERFORD, OHIO, ASSIGNORS TO KEYSTONE FARM MACHINE COMPANY, OF YORK, PENNSYLVANIA.

FASTENER FOR TEETH FOR WEEDERS.

SPECIFICATION forming part of Letters Patent No. 794,986, dated July 18, 1905.

Application filed April 22, 1905. Serial No. 256,976.

*To all whom it may concern:*

Be it known that we, JACOB S. KENDIG, residing at York, in the county of York and State of Pennsylvania, and SAMUEL A. McCUNE, residing at New Waterford, in the county of Columbiana and State of Ohio, citizens of the United States, have invented certain new and useful Improvements in Fasteners for Teeth for Weeders and the Like, of which the following is a specification.

This invention relates to means for securing the teeth of an agricultural implement, such as a weeder, and has for its object the provision of improvements, as will be hereinafter set forth.

Figure 1 is a side view of a fastener and a tooth secured thereby, the support being shown in section. Fig. 2 shows the different parts of the fastener in perspective and also sufficient of the tooth-guard and tooth to show the application of the fastener thereto, the remainder of the tooth and guard being broken away. Fig. 3 is a perspective view of a plurality of teeth secured to a support by the improved fastener.

Referring to the drawings, the fastener comprises two right-angled portions. These two portions are adapted to be held together and to their support by securing means, as a bolt C. The bolt C is also adapted to secure the guard D and also serves to clamp the fastener about the tooth E.

The portion A has a central groove 1 and a hole 2, adapted to receive the end of the tooth, which is shown as being bent at right angles. The other leg of the portion A has at its back a recess 3, adapted to receive the end of the guard D, which is bent at right angles, as shown, over the top of the portion A. In the sides of the leg last referred to are formed recesses 4, and this leg is also provided with a central hole 5 for the passage of the securing means. The other portion of the fastener is also right-angled and in one of its legs is provided with a groove 6, adapted to coöperate with the groove 1 in the portion A in receiving and holding the tooth. The other leg of the portion B has formed upon it wedge-shaped projections 7, adapted to enter the recesses 4. This last leg is also provided with a hole 8 for the passage of the securing means.

Support 9, to which the tooth is secured by the fastener, may be of any suitable construction, but is preferably a bar making a right angle, as shown.

To secure the apparatus to the bar, the bent end of a tooth is entered into the hole 2 and slot 1. The portion B is then applied, so that the projections 7 enter the slots 4, and the tooth enters the slot 6. The guard D may be then applied by placing its bent end within the recess 3, and the bolt C is passed through the holes 5 and 8 of the sections A and B and a hole in the bent end of the guard D. Apparatus thus assembled may then be assembled with the support 9, the bolt C entering through a hole therein, as shown most clearly in Fig. 1. The nut having been applied to the bolt, it is tightened against the support in the ordinary manner, when by reason of the engagement between the two portions A and B afforded by the engagement of the projection 7 and the sides of the slots 4 the clamping-legs of the portions A and B will be forced together and tightly clamp the tooth. The tooth will thus be held firmly and the parts will be rigidly secured to the bar 9.

While we have illustrated our invention in what we now consider to be its best form, it will be obvious that it may be embodied in other constructions than that shown, and therefore the invention should not be limited to the structure shown.

What we claim is—

1. A tooth-fastener comprising two right-angled portions adapted to secure a tooth between a leg of each and having holes in the other legs adapted to receive a securing means, said securing means, when in position, lying in the same plane with the tooth, substantially as described.

2. A tooth-fastener comprising two right-angled portions, a leg of each of said portions having a central groove, said groove being adapted to receive a tooth, the other legs of said portions being adapted to engage with means for securing the fastener in position, substantially as described.

3. A tooth-fastener comprising two right-angled portions, a leg of each of said portions having a central groove, the said groove being adapted to receive a tooth, and centrally-located holes for the reception of securing means in the other legs, substantially as described.

4. A tooth-fastener comprising two right-angled portions adapted to secure a tooth between a leg of each and having holes in the other legs adapted to receive a securing means, one of said portions having a hole adapted to receive the end of the tooth, substantially as described.

5. A tooth-fastener comprising two right-angled portions adapted to secure a tooth between a leg of each and having holes in the other legs adapted to receive a securing means, said securing means when in position lying in the same plane with the tooth and one of said portions having a hole adapted to receive the end of the tooth, substantially as described.

6. A tooth-fastener comprising two right-angled portions having a central groove in a leg of each, said grooves being adapted to receive a tooth, the other legs being adapted to be engaged by securing means and one of said portions having a hole adapted to receive the end of the tooth, substantially as described.

7. A tooth-fastener comprising two right-angled portions having a central groove in a leg of each, the said groove being adapted to receive a tooth, the other legs of said portions having central holes adapted to receive securing means, one of said portions having a hole adapted to receive the end of the tooth, substantially as described.

8. In a machine of the class described, a tooth-fastening device comprising a right-angled portion having a tooth-receiving groove and a hole for receiving the end of a tooth in one leg, substantially as described.

9. In a machine of the class described, a tooth-fastening device comprising a right-angled portion having a central tooth-receiving groove and a hole for receiving the end of the tooth, said groove and hole being located in one leg, substantially as described.

10. In a machine of the class described, a tooth-fastening device comprising a right-angled portion having a central tooth-receiving groove and a central hole adapted to receive the end of a tooth, said groove and hole being located in one leg, substantially as described.

11. In a machine of the class described, a tooth-fastening device comprising a right-angled portion, a tooth-receiving groove in one leg and a hole for the passage of securing means in the other leg, substantially as described.

12. In a machine of the class described, a tooth-fastening device comprising a right-angled portion having a tooth-receiving groove and a hole in one leg and a hole for the passage of securing means in the other leg, substantially as described.

13. In a machine of the class described, a tooth-fastening device comprising a right-angled portion having a central tooth-receiving groove and central tooth-hole in one leg and a central hole in the other leg for the passage of securing means, substantially as described.

14. In a machine of the class described, a tooth-fastening device comprising a right-angled portion having one leg adapted to clamp a tooth and a wedge-shaped projection from the other leg, substantially as described.

15. In a machine of the class described, a tooth-fastening device comprising a right-angled portion having one leg adapted to clamp a tooth, a centrally-located hole in the other leg for the passage of fastening means and a wedge-shaped projection on each side of said hole, substantially as described.

16. In a machine of the class described, a tooth-fastening device comprising a right-angled portion having a central tooth-receiving groove in one leg, a wedge-shaped projection from, and a hole in, the other leg, substantially as described.

17. In a machine of the class described, a tooth-fastening device comprising a right-angled portion having one leg adapted to clamp a tooth and the other leg having a recess at its back, substantially as described.

18. In a machine of the class described, a tooth-fastening device comprising a right-angled portion having one leg adapted to clamp a tooth and the other leg having a recess adapted to receive a wedging projection, substantially as described.

19. In a machine of the class described, a tooth-fastening device comprising a right-angled portion having a central tooth-receiving groove in one leg and a central hole for the passage of fastening means in the other leg, the latter leg having a recess at its back and a recess on each side adapted to receive wedging projections, substantially as described.

20. In a machine of the class described, a tooth-fastening device comprising a right-angled portion having a central tooth-receiving groove and a tooth-receiving hole in one leg and a central hole for the passage of fastening means in the other leg, the latter leg having a recess at its back and recesses on each side adapted to receiving wedging projections, substantially as described.

21. A tooth-fastener comprising right-angled portions each having a leg adapted to clamp a tooth and holes in the other legs for the passage of securing means said portions engaging with each other to clamp the tooth as the securing means is tightened, substantially as described.

22. A tooth-fastener comprising right-angled portions each having a leg adapted to clamp a tooth and holes in the other legs for the passage of securing means said portions having a wedging engagement with each other to clamp the tooth as the securing means is tightened, substantially as described.

23. The combination with a support of a tooth-fastener comprising right-angled portions a leg of each of said portions being adapted to clamp a tooth and holes in the other legs for the passage of securing means one of said portions having a recess at its back, and guard having a hole and entering said recess, a tooth entering into the fastener and securing means passing through said holes in said fastener, and guard into said support, substantially as described.

24. The combination with a right-angled bar of a fastener comprising right-angled portions a leg of each of said portions being adapted to clamp a tooth and holes in the other legs for the passage of a bolt one of said portions having a recess at its back, a guard having a hole and entering said recess, a tooth entering into the fastener and a bolt passing through said holes in said fastener and guard into said support, substantially as described.

In testimony whereof we have signed our names to this specification each in the presence of two subscribing witnesses.

JACOB S. KENDIG.
SAMUEL A. McCUNE.

Witnesses for Kendig:
 JAS. H. SCHALL,
 J. W. SMITH.

Witnesses for McCune:
 J. H. C. LYON,
 WM. MOORE.